United States Patent
Baumgartner et al.

(10) Patent No.: US 8,315,771 B2
(45) Date of Patent: *Nov. 20, 2012

(54) SELF-ENERGIZING DISK BRAKE AND CONTROL METHOD FOR A SELF-ENERGIZING BRAKE

(75) Inventors: Johann Baumgartner, Moosburg (DE); Matthias Seidenschwang, Munich (DE); Ernst Dieter Bieker, Oberaudorf (DE); Luise Ulrike Bieker nee Rothe, legal representative, Oberaudorf (DE); Dirk Ganzhorn, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 999 days.

This patent is subject to a terminal disclaimer.

(21) Appl. No.: 11/665,360

(22) PCT Filed: Sep. 28, 2005

(86) PCT No.: PCT/EP2005/010448
§ 371 (c)(1),
(2), (4) Date: Nov. 18, 2008

(87) PCT Pub. No.: WO2006/042621
PCT Pub. Date: Apr. 27, 2006

(65) Prior Publication Data
US 2009/0192690 A1    Jul. 30, 2009

(30) Foreign Application Priority Data

Oct. 13, 2004  (DE) .......................... 10 2004 050 065
Apr. 4, 2005   (DE) .......................... 10 2005 015 408
Jun. 30, 2005  (DE) .......................... 10 2005 030 618

(51) Int. Cl.
*B60T 7/12* (2006.01)

(52) U.S. Cl. ................ 701/78; 701/70; 701/71; 701/79; 701/81; 188/71.8; 188/72.8; 188/79.52; 188/196 V; 303/122.03

(58) Field of Classification Search ............... 701/70, 701/71, 78, 79, 81; 188/70 R, 70 B, 72.2, 188/72.7, 72.8, 156, 1.11 L, 71.7, 71.8, 196 R, 188/196 V, 79.51, 79.52; 303/122.03
See application file for complete search history.

(56) References Cited

U.S. PATENT DOCUMENTS 3,285,372 A    11/1966  Rossmann
(Continued)

FOREIGN PATENT DOCUMENTS

DE    36 10 569 A1    10/1987
(Continued)

OTHER PUBLICATIONS

International Search Report dated Feb. 24, 2006 (Six (6) pages).

*Primary Examiner* — Khoi Tran
*Assistant Examiner* — Jonathan L Sample
(74) *Attorney, Agent, or Firm* — Crowell & Moring LLP

(57) ABSTRACT

A method for controlling a self-energizing disc brake having an electric actuator in which an activation force applied to the actuator is amplified using a self-energizing device arranged between the actuator and brake lining is described. The method has a brake application unit for applying at least one brake lining to one side of a brake disc by carrying out an application movement of the brake lining relative to the brake disc, the application movement having at least a first movement component in a direction parallel to a rotational axis of the brake disc and a second movement component in a direction tangential to the rotational axis of the brake disc. The method includes also controlling at least one electromotive drive for activating the brake application unit. Rotation of the shaft of the electromotive drive is converted to a non-linear displacement of the brake pad in the tangential direction.

5 Claims, 6 Drawing Sheets

U.S. PATENT DOCUMENTS

| | | | | |
|---|---|---|---|---|
| 5,058,714 | A * | 10/1991 | Weiler et al. | 188/196 P |
| 5,582,273 | A | 12/1996 | Baumgartner et al. | |
| 6,008,604 | A | 12/1999 | Maisch | |
| 6,318,513 | B1 * | 11/2001 | Dietrich et al. | 188/72.7 |
| 6,491,138 | B1 * | 12/2002 | Spagele | 188/70 B |
| 7,258,206 | B2 * | 8/2007 | Severinsson | 188/72.7 |
| 7,398,866 | B2 * | 7/2008 | Baumann et al. | 188/72.7 |
| 2003/0150677 | A1 * | 8/2003 | Maron et al. | 188/158 |
| 2004/0195055 | A1 * | 10/2004 | Gilles | 188/73.1 |
| 2004/0245056 | A1 * | 12/2004 | Baumann et al. | 188/72.8 |
| 2005/0067233 | A1 * | 3/2005 | Nilsson et al. | 188/158 |
| 2005/0168066 | A1 * | 8/2005 | Svendenius et al. | 303/150 |
| 2009/0192690 | A1 * | 7/2009 | Baumgartner et al. | 701/78 |
| 2010/0032249 | A1 * | 2/2010 | Baumann et al. | 188/72.2 |
| 2011/0100768 | A1 * | 5/2011 | Baumgartner et al. | 188/72.2 |

FOREIGN PATENT DOCUMENTS

| | | |
|---|---|---|
| DE | 37 16 202 A1 | 11/1988 |
| DE | 101 51 950 A1 | 5/2003 |
| EP | 0 153 265 A1 | 8/1985 |
| EP | 0 688 404 B1 | 12/1995 |
| EP | 0 953 785 A2 | 11/1999 |
| WO | WO 02/14708 A2 | 2/2002 |
| WO | WO 03/071150 A1 | 8/2003 |
| WO | WO 03/100282 A1 | 12/2003 |

* cited by examiner

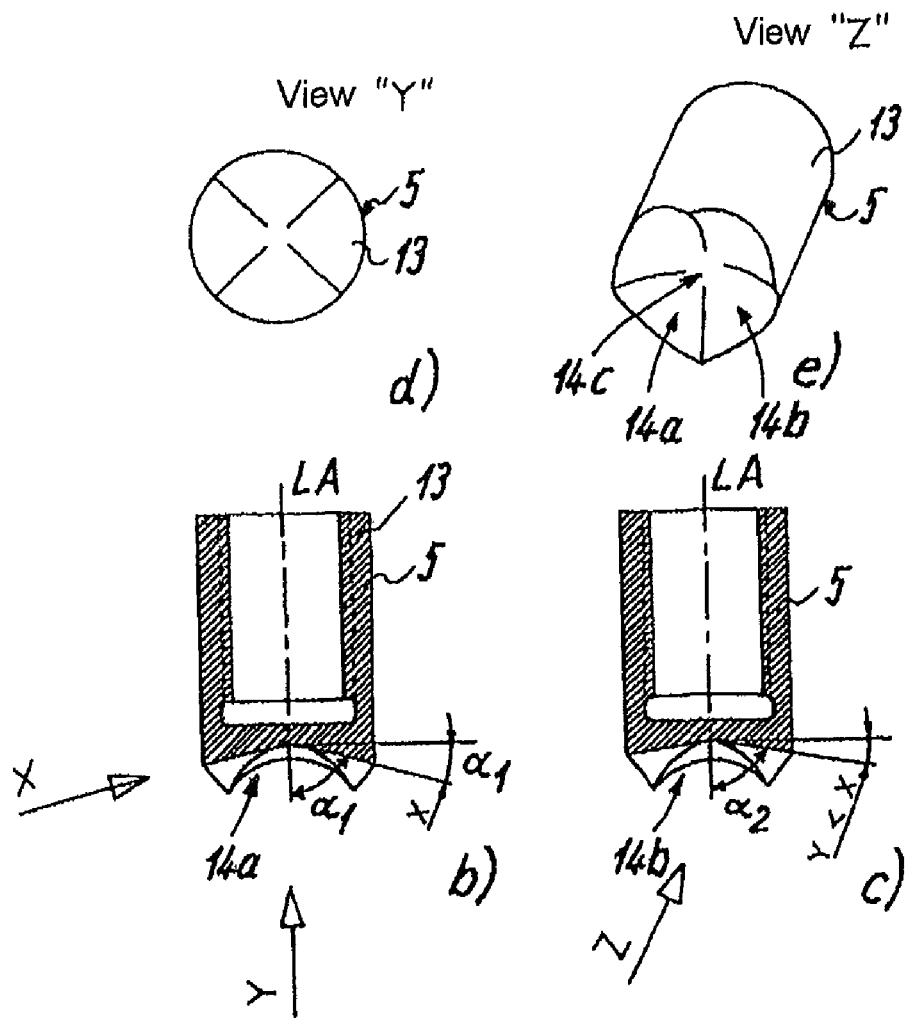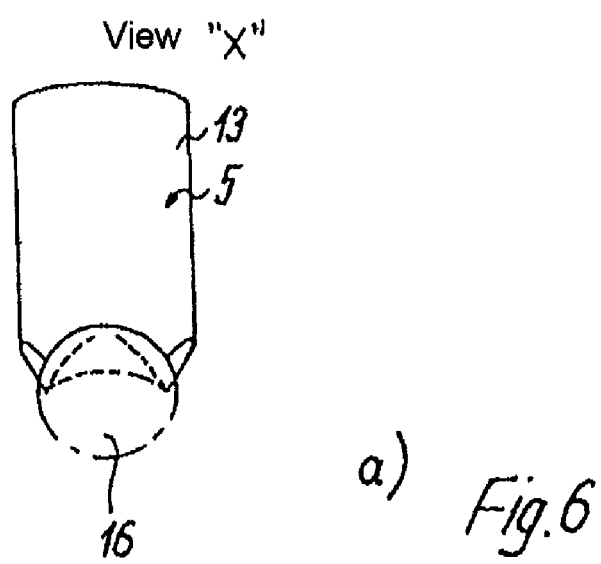
Fig. 6

SELF-ENERGIZING DISK BRAKE AND CONTROL METHOD FOR A SELF-ENERGIZING BRAKE

BACKGROUND AND SUMMARY OF THE INVENTION

The invention relates to a self-energizing disk brake having an electric actuator, where an activation force is amplified using a self-energizing device arranged between the actuator and a brake lining, and to a method for activating a self-energizing brake.

Self-energizing brakes are known in a wide variety of embodiments. For example a classic design of self-energizing brakes are drum brakes in which a brake shoe is arranged in a leading fashion so that the friction forces between the brake lining and drum support the tensioning forces.

In contrast, in disk brakes it was assumed in the past that it was in fact a significant advantage of this design of brake that, with brake linings which act exclusively perpendicularly to the circumferential brake disk and on which only an activation device which acts parallel to the axis of the brake disk acts with a force which is aligned in such a way, there is no self-energizing effect. This was the case to an even greater extent in disk brakes for heavy commercial vehicles in which the activation is preferably carried out hydraulically or pneumatically.

However, if disk brakes with activation devices which are operated electromotively are also to be used in relatively heavy commercial vehicles, the self-energizing disk brake becomes an option since it provides the possibility that, owing to the self-energization of the brake, the electric motor can be given smaller dimensions than would be possible with a non-self-energizing disk brake.

Self-energizing disk brakes are known in a wide variety of embodiments. However, the majority of solutions described describe operational principles which permit self-energization but due to a lack of price competitiveness as well as due to their awkward complex design are not suitable for implementing a disk brake for heavy utility vehicles which is ready for series production and can be manufactured economically, and often therefore have not passed the stage of theoretical ideas.

Against this background, the object of the invention is to provide an electromechanically operated, self-energizing disk brake which can be manufactured cost-effectively with a simple design. It is preferably also to provide the advantage that the power demand of the electromotive drive is minimized compared to comparable, directly electromechanically activated brakes by using efficient self-energization even in the boundary region of the coefficient of friction of the brake lining.

The invention achieves this object as will be described in the exemplary embodiments of the specification and claims below.

The invention implements a configuration of the brake application unit such that it converts uniform rotations of an output shaft of the electromotive drive during a brake application movement into a movement of the brake lining, the movement component of which movement is nonlinear at least in the tangential direction (direction U).

Advantageous embodiments are further described in the following embodiments.

The invention not only reduces the manufacturing costs of a brake system for utility vehicles but it also significantly minimizes the power demand of the electromotive drive in relation to comparable directly electromechanically activated brakes by using of efficient self-energization even in the boundary region of the coefficient of friction of the brake lining. According to particularly advantageous variants, it is even possible to significantly reduce the power demand compared to other self-energizing brakes.

It is also possible here to meet the same power requirements compared to modern compressed air brakes and also to satisfy the same predefined installation conditions and weight prescriptions.

The adjustable ramp system can also be used to implement a reliable parking brake which adjusts automatically even when friction elements shrink owing to cooling. A further significant advantage of the invention is therefore the fact that with the proposed disk brake a reliably acting parking brake is also implemented without additional necessary activation components.

For this purpose, the ramp angle with the greatest degree of self-energization must be dimensioned in such a way that self-energization is possible even at the lowest conceivable coefficient of friction of the brake lining.

When the brake is inserted, there is therefore an exclusively mechanically holding effect of the brake. If brake linings and/or the brake disk shrink or if there is a drop in the coefficient of friction which occurs during the shut-off phase, the brake and the self-energization of the brake are automatically adjusted in order to keep the vehicle in a stationary state.

The electromotive drive is preferably coupled to an open-loop and/or closed-loop control device which is configured to perform open-loop or closed-loop control of the position of the actuator element or brake lining. In this context, the position of the brake lining unit is set according to predefined values of a superordinate unit which maybe, for example, a control device.

This open- and/or closed-loop control device is preferably operated as follows: The basis of the preferred closed-loop control concept is a braking or deceleration closed-loop control process of the vehicle such as is customary in contemporary EBS closed-loop-controlled vehicles with a compressed air brake system.

In such brake systems, the driver or an autonomous vehicle system presets a braking request or deceleration request which is converted into a "braking" signal which is processed by the EBS system and converted into a corresponding actuation of the wheel brake actuators (pneumatic cylinders or electric motor) which brings about corresponding activation of the brakes.

In pneumatically activated disk brakes, a pure pressure control process of the activation cylinder of the respective brake is usually carried out according to the relationship brake pressure→cylinder force→tensioning force→frictional force which can be determined and reproduced within sufficiently tight limits of precision.

In self-energizing, electromagnetically activated brakes, this sufficient precision is generally no longer provided between the actuator manipulated variable and the frictional force.

The motor current is frequently used as the activator manipulated variable of electromechanically self-energizing brakes of this kind. However, such large tolerances of the achievable braking effect arise from the engine efficiency levels, which are for example also temperature dependent, the efficiency level of the step down gear mechanism as well as finally the efficiency level of the amplification method in conjunction with the variations in the coefficient of friction of the brake linings, that it no longer appears possible to control the braking effect with the motor current.

It has been proposed to measure the frictional force and carry out closed-loop control on it directly (as shown in International Patent Document WO 03/100282 or later for the self-energizing brake which is known and has wedge activation as shown in European Patent Document EP 0 953 785 B1).

In this method there is the problem of finding a suitable measuring method for determining the frictional force. Furthermore, there is the difficulty of the frictional source being influenced to a very high degree by brake oscillations and wheel oscillations and thus constituting a controlled variable which can be controlled only with difficulty.

The aim is therefore to find a closed-loop control method for self-energizing brakes which is well suited in particular also to the claimed disk brakes and which avoids the problems associated with closed-loop control of the frictional force.

To summarize, the present invention for achieving this object implements a method for actuating a self-energizing brake in which an activation force applied by the actuator is amplified using a self-energizing device arranged between the actuator and brake lining, wherein the actuator is coupled to an open-loop or closed-loop control device which is configured to actuate the actuator in order to set the position of the brake lining units in such a way, which method is distinguished by the fact that during the closed-loop control process tolerance-conditioned braking force differences, referred to as third controlled variable, among the wheel brakes on which the closed-loop control process is performed by the brake system, are determined and compensated.

The invention also provides a method for carrying out a parking braking operation, with a brake according to the invention in which during a parking braking operation the brake is applied solely using the brake plungers until the rolling elements have moved the lining units against the disk, after which the self-energizing effect starts without the crank being activated.

After this, sensor systems which are already present and are reliable and proven are used to sense the signals which are necessary for the closed-loop control.

A First Variant Will be Explained First
Solution 1: Third Controlled Variable

The solution described below provides a brake system in which, between the "braking or deceleration" vehicle controlled variable and the "current or actuator position" actuator manipulated variable, a third controlled variable is introduced which is intended to substantially compensate the tolerance-conditioned braking force differences among the wheel brakes on which closed-loop control is carried out by the brake system.

This third controlled variable is sensed individually for each vehicle wheel and compared with the values determined at the other wheels.

When there are inadmissible deviations from the defined values of the EBS system, these predefined values (motor current or actuator position) for the individual brakes have a correction factor superimposed on them individually, with which correction factor the existing braking force differences are compensated.

This adaptation process is carried out, if appropriate, in relatively small increments over a plurality of brake activation processes.

The wheel slip of the respective vehicle wheel is preferably evaluated as a third controlled variable.

In this method it is surprisingly unnecessary to generate a precise relationship between the wheel slip and braking force but rather the wheel slip characteristic variables which occur at the individual wheels are adjusted to form a specific predefined set point value for the EBS system. In particular, in this context the wheel slip characteristic variables of the brakes of the individual axles are adjusted as precisely as possible. The matching of the wheel slip characteristic variables of the axles to one another takes place in a second step taking into account the possibly different predefined values of the brake system for the individual axles.

Alternatively, the tensioning force acting on the brake can also be determined as the third controlled variable. The tensioning force can be determined at the components of the brake which pick up force, for example at the brake caliper, by measuring deformation paths or component stresses. In the process, the necessary sensor can be arranged in the interior of the brake and integrated, if appropriate, into an electronic control system which is arranged within the brake.

Solution 2: Open Loop Control by Means of Actuator Position or Motor Current Combined with Tolerance Compensation A second approach to the solution is based on the existing control algorithm of contemporary EBS systems in which only the actuator manipulated variable of pressure is replaced by another system-specific manipulated variable. The actuator position and motor current are particularly appropriate as system-specific manipulated variables.

In the discussion of the prior art, the large tolerance variation, which makes this method more difficult to apply, has already been mentioned. It is therefore necessary largely to eliminate the tolerance influences present in this effect chain.

This is preferably brought about with one or more of the following measures:

Before the brake actuator is activated, the venting play is overcome by the adjustment device so that the venting play is already no longer present as a fault source at the start of the actual brake application movement by the brake actuator.

The influence of the brake lining compression—which differs due to the wear state and temperature state—on the predefined set point values of the brake system is compensated by correction factors. For this purpose, the wear state of the two brake linings is determined precisely for each brake. Likewise, by evaluating the energy balance of the brakes their thermal content and hence also the temperature of the brake lining are determined. This energy balance can be evaluated by of the electronic brake system or by of an electronic open-loop controller which is integrated into the brakes.

Brake-specific variations in the relationship between the tensioning force and the widening of the caliper are compensated by a calibration process when the brakes are fitted. For this purpose, defined forces are applied to the brake caliper, for example during the final inspection on the assembly belt, and the widening which occurs in the process is determined or the actuator adjustment travel necessary for this is determined directly. The defined application of force is preferably carried out in such a way that force pickups are used in the brake caliper, for example instead of the brake disk, and the actuator is then actuated in order to generate the predefined tensioning forces. The relationship between the tensioning force and the actuator position which is detected in this way can then be stored, for example in an electronic system which is integrated into the brakes.

When the motor current is applied as an actuator variable, the tolerance compensation which is described can be applied in the same way. The relationship between the tensioning force and the motor current is then determined during the calibration process and stored as described above.

During this calibration process, the tolerance influences of the gear mechanism and electric motor are also eliminated at least for room temperature conditions. The temperature influence on the electric motor, for example on its permanent magnet, can in turn be compensated by the abovementioned thermal balance calculation.

The resulting normal force for a specific position of the self-energizing device is dependent on a large number of factors such as
- current venting play
- rigidity of the brake (caliper) perpendicular to the frictional surface
  - in particular the variable rigidity of the lining which is dependent on
    - locations of linings
    - wear state, that is to say residual thickness
    - temperature
    - prior history (effect on compressibility)
    - take up of moisture
- variable temperature of caliper and disk during the braking process
- coefficient of friction between the brake lining and brake disk (effect on self-energizing effect and thus also on the normal force and on the frictional force). This is itself dependent, inter alia, on
  - temperature
  - speed According to the teaching of the invention, selective actuation of the ramp position in order to bring about a specific pressing force is virtually impossible if the influence of the aforesaid parameters is disregarded entirely.

In contrast, by virtue of the invention, a desired brake lining pressing force can be brought about by selective travel control of the self-energizing device or of the brake lining and it is thus possible to dispense with a difficult-to-implement adjustment of the setpoint value to the actual value of the frictional force or else to permit selective pilot control for a brake with a setpoint value/actual value comparison of the brake lining pressing force or else frictional force.

According to the invention this is achieved by virtue of the fact that interference variables which influence the correlation between the ramp position or brake lining position and the brake lining pressing force are compensated by taking into account relevant parameters.

For this purpose, a characteristic curve is determined which defines a corresponding pressing force in accordance with a position of the self-energizing device, for example a ramp, or an actuation travel which is predefined by the actuator.

This characteristic curve is preferably updated continuously, in order, for example, to be able to take into account influences such as temperature and speed.

The application point of the brake lining on the brake disk is determined, for example using the current of an electric actuator or by calculating it from the current venting play and ramp geometry.

The positive gradient of the characteristic curve is adapted as a function of the ramp position or brake lining position to:
a) Rigidity of the brake (caliper) perpendicular to the frictional surface can be determined experimentally or by calculation and is virtually constant.
b) In particular the variable rigidity of the lining which is dependent on
    brake lining locations
    either by specification within a tolerable framework or by inputting/selecting corresponding parameters in an electronic control device when the brake lining is changed.
    wear state, that is to say residual thickness is sensed continuously, as is known,
    temperature
    either by measurement or by calculation, for example by using energy integration, cooling power etc.
    prior history (effect on compressibility)
    logging of the prior history of the brake lining (aging), for example by using energy integration, maximum temperature or the like. Relationship between the rigidity of the brake lining and aging can be determined empirically.
c) The temperature of the caliper and disk which varies during the braking process
    either by measurement (for example thermal elements) or calculation.
d) Coefficient of friction between the brake lining and brake disk (effect on the self-energizing effect and thus on the normal force and on the frictional force).
    This is itself dependent, inter alia, on
    temperature
    speed
    empirical determination of the dependents.

Alternatively or additionally, closed-loop control of the brake can also be carried out by determining the normal force which acts between the brake lining and disk. The normal force can be determined, for example, by sensing the expansion of the calipers. If the actual normal force deviates from the desired normal force, the latter can be adapted by the described travel/force characteristic curve.

The brake application unit or ramp can be implemented in a defined fashion by using an angle either as a pressure ramp, traction ramp or traction/pressure ramp. In the case of a traction/pressure ramp in particular a self-locking system is advantageously selected as a drive, i.e. a high force which results in the direction of the activation from an unusually high/low coefficient of friction cannot lead to uncontrollable displacement of the ramp.

The described compensation of the interference variables can also be used for directly activated systems, in which an activation force=support force.

As another variation in a different embodiment of the invention, there is provision for the electric motor to rotate a crank directly or using at least one or more gear mechanisms, the crank having a crank tappet as output element which serves to move the brake lining unit, and the crank tappet is oriented parallel to the axis of the brake disk. The arrangement is compact and easy to implement in structural terms.

In this context, the electric motor preferably has an output shaft which is oriented parallel to the axis of the brake disk and by which the crank which acts on the brake lining unit is rotated directly or by another, intermediately connected gear mechanism elements.

If each of the pressure surfaces of the at least two or more brake plungers which preferably have variable longitudinal lengths are provided, on the side facing the brake lining unit, with a recess with a ramp-shaped contour into which a rolling element engages which is supported both on the ramp-shaped contour of the pressure surfaces of the brake plungers and on the brake lining unit, the self-energizing brake can be used in a particularly versatile way and closed-loop control can be carried out on it in a reliable way. It is expedient here if the at least one electromotive drive for activating the brake application unit or a further electromotive drive is also configured to drive the brake plungers at least in order to vary the axial length of the brake plungers.

According to a further independent variant of the invention, the brake application unit also has at least one, in particular two or more, brake plungers (adjustment for pistons) which are oriented parallel to the axis BA of the brake disk and which are supported at one of their ends on the brake caliper or by a bearing device on a component which is connected to the brake caliper, the bearing device permitting in each case at least some of the brake plungers to rotate about their longitudinal axis.

To summarize, the following advantages occur both independently and also in combination:

Circumferential activation by means of a crank
    coaxially arranged drive unit
    preferentially integrated electronic control system
Simple combination of spindle actuation and crank activation
    application function using spindles—force stroke by using a crank
    application and adaptation braking by using spindles
    crank activation for high-load braking operations
    parking brake function using spindles
Reliable and uncomplicated parking brake function
    Pretensioning using spindles—automatic post-tensioning using the amplification system without crank activation.
    If appropriate additional post-tensioning using crank activation
    Addition of a highly amplifying ramp angle
Use of a common drive
    Shiftable distribution gearing
    Automatically shifting (only application function by using spindles)
    Extraneously shifted (parking function and partial load braking function using spindles)
Variable self-energization
    Multi-stage, shiftable
        Infinitely variable, automatically adaptive and/or extraneously controlled
Controlled self-locking of the brake plungers
    Controlled, and in the event of faults automatic, switching over from self-locking to non-self-locking operation
        a) self-locking spindles and addition of a non-self-locking preliminary stage (folding ramp, spherical ramp etc.)
        b) non-self-locking spindles and addition of a preliminary stage which brings about self locking (self-locking gear stage etc.)
Play-free drive
Measures for eliminating play in the force transmission path from the drive motor to the brake lining pressure plate.

BRIEF DESCRIPTION OF THE DRAWINGS

The invention is explained in more detail below with reference to the drawings using the exemplary embodiments. In the drawings:

FIG. 6 shows diagrams of views of a partial region of a pressure plunger, and FIG. 6a shows additionally a pressure element for application against a brake lining unit.

DETAILED DESCRIPTION OF THE DRAWINGS

The exemplary embodiments which are illustrated are described below with reference to the drawings:

Firstly, the functional principle in FIG. 1 with a nonadjustable ramp gradient in the pressure surfaces 5, 6 of the brake plungers will be described in more detail.

Figure 1:
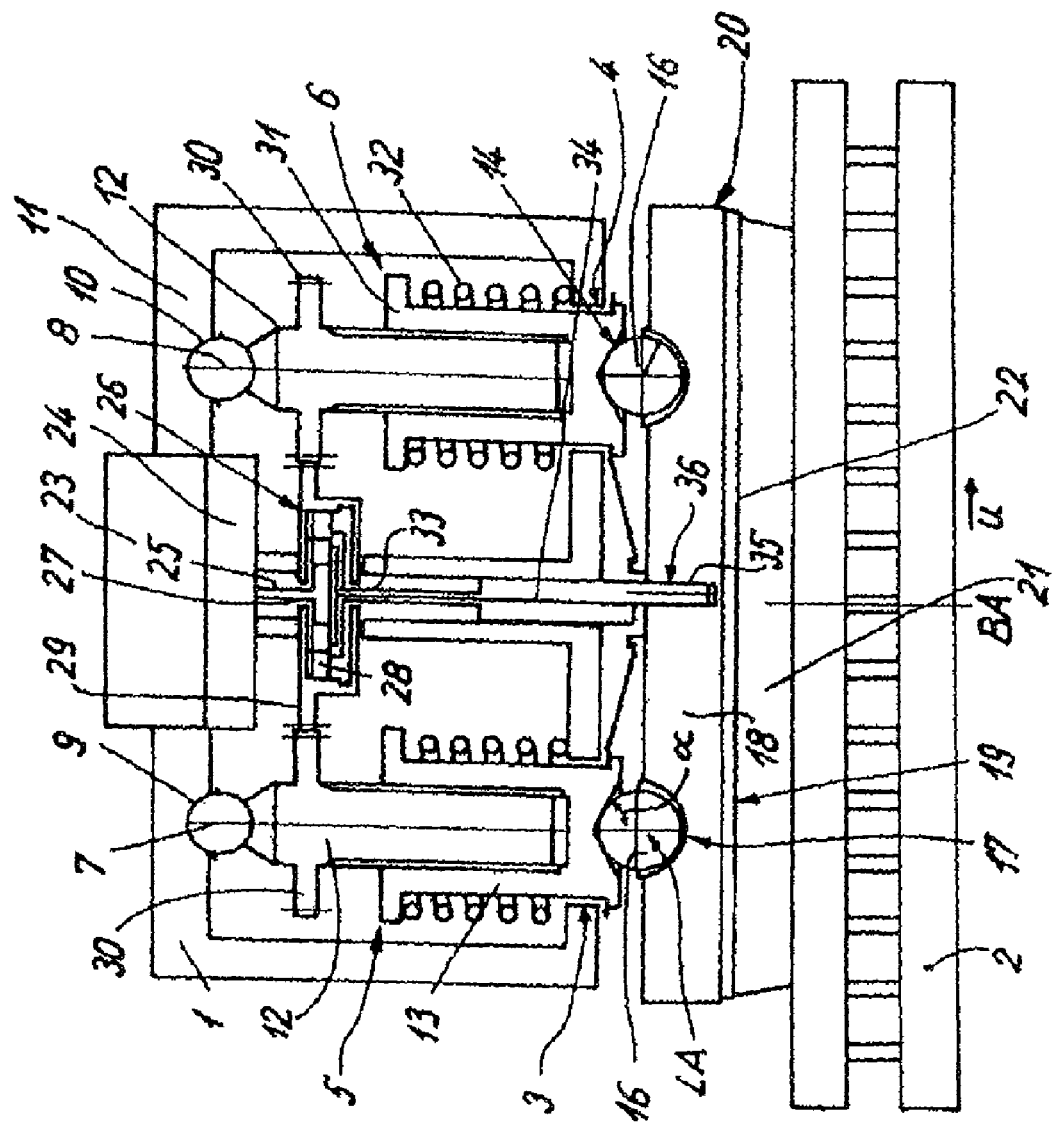
FIGS. 1-3 are diagrams showing sectional views which illustrate the basic design of different variants of disk brakes according to the invention.
Figure 2:
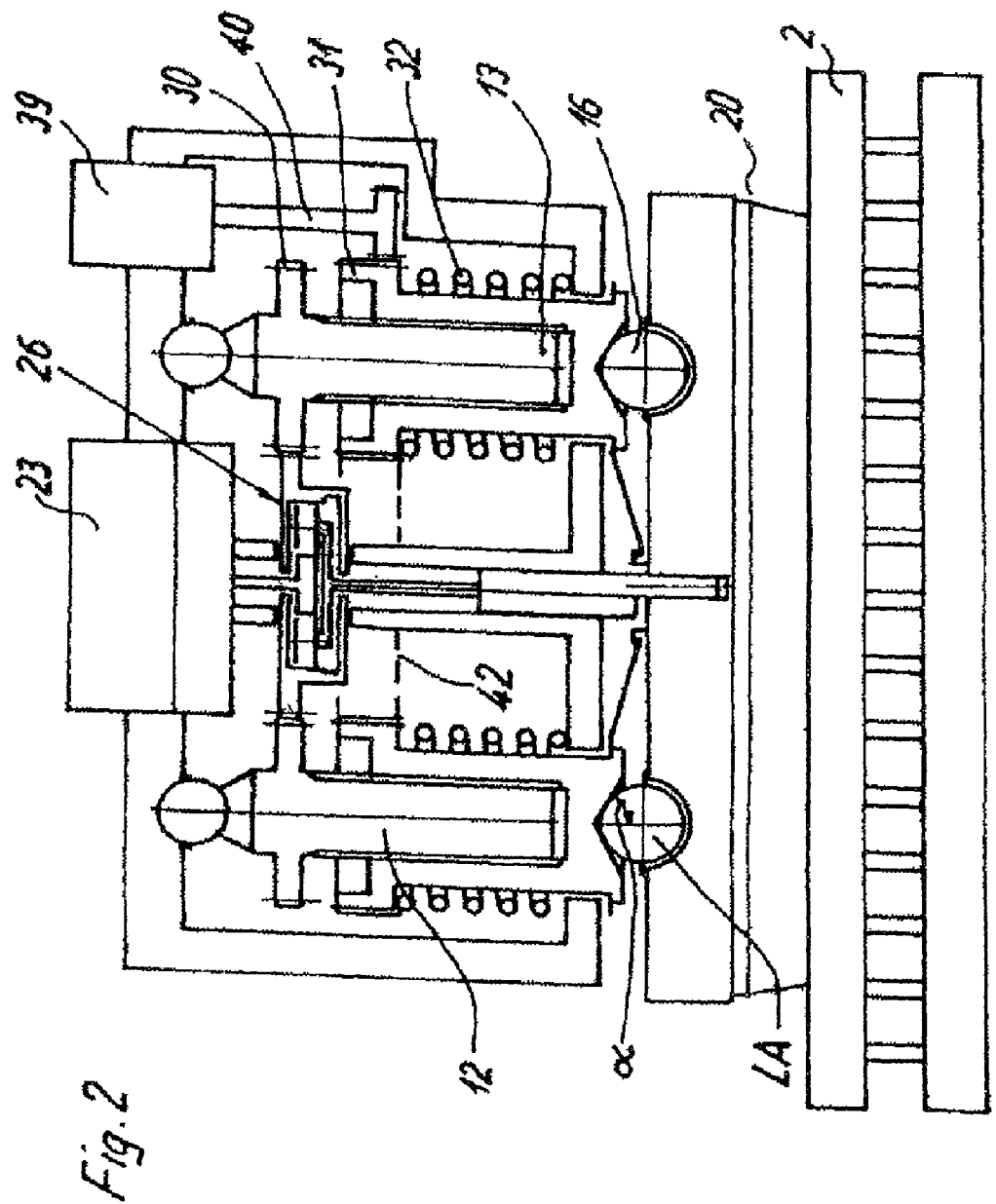
Figure 3:
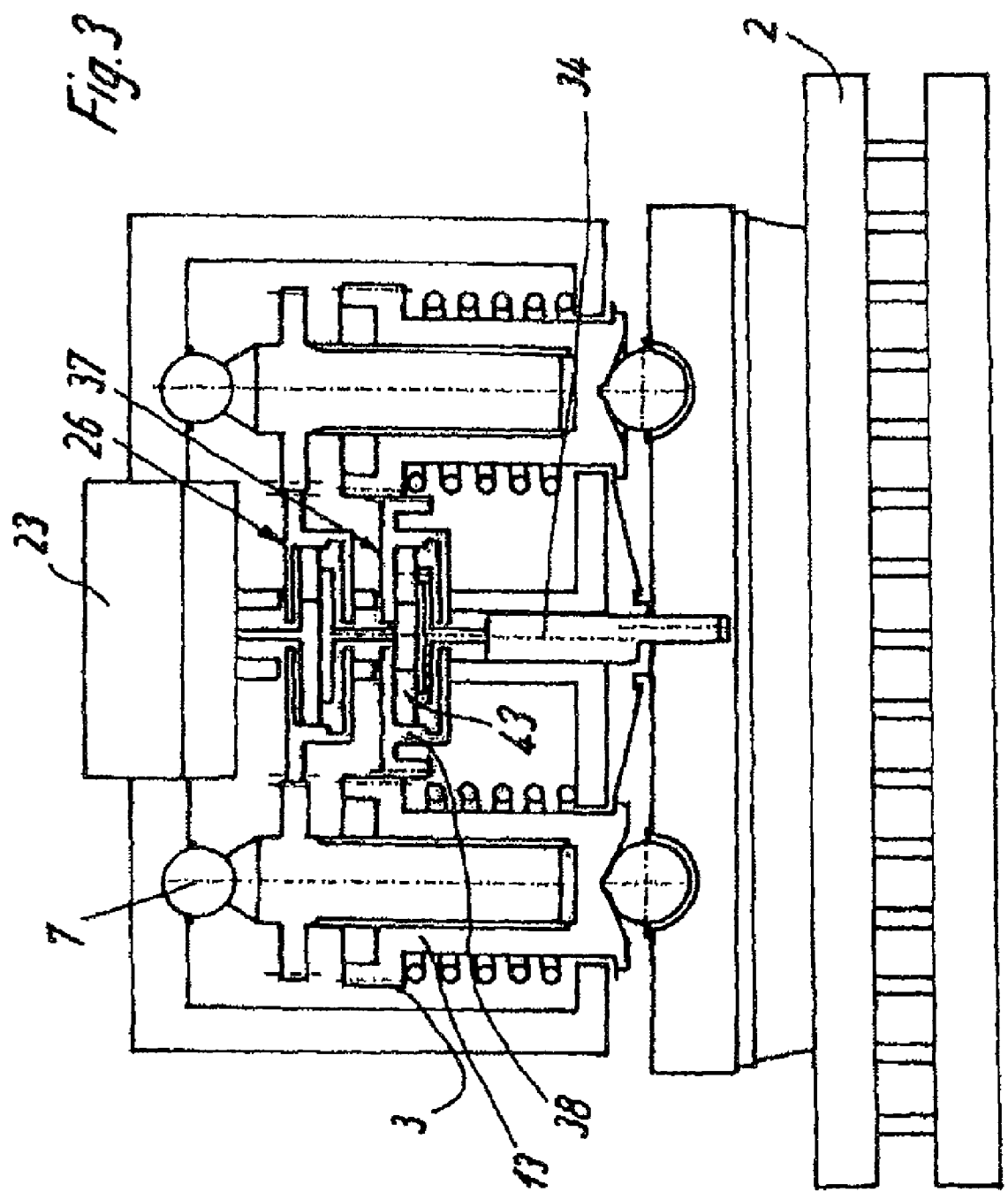
Figure 4:
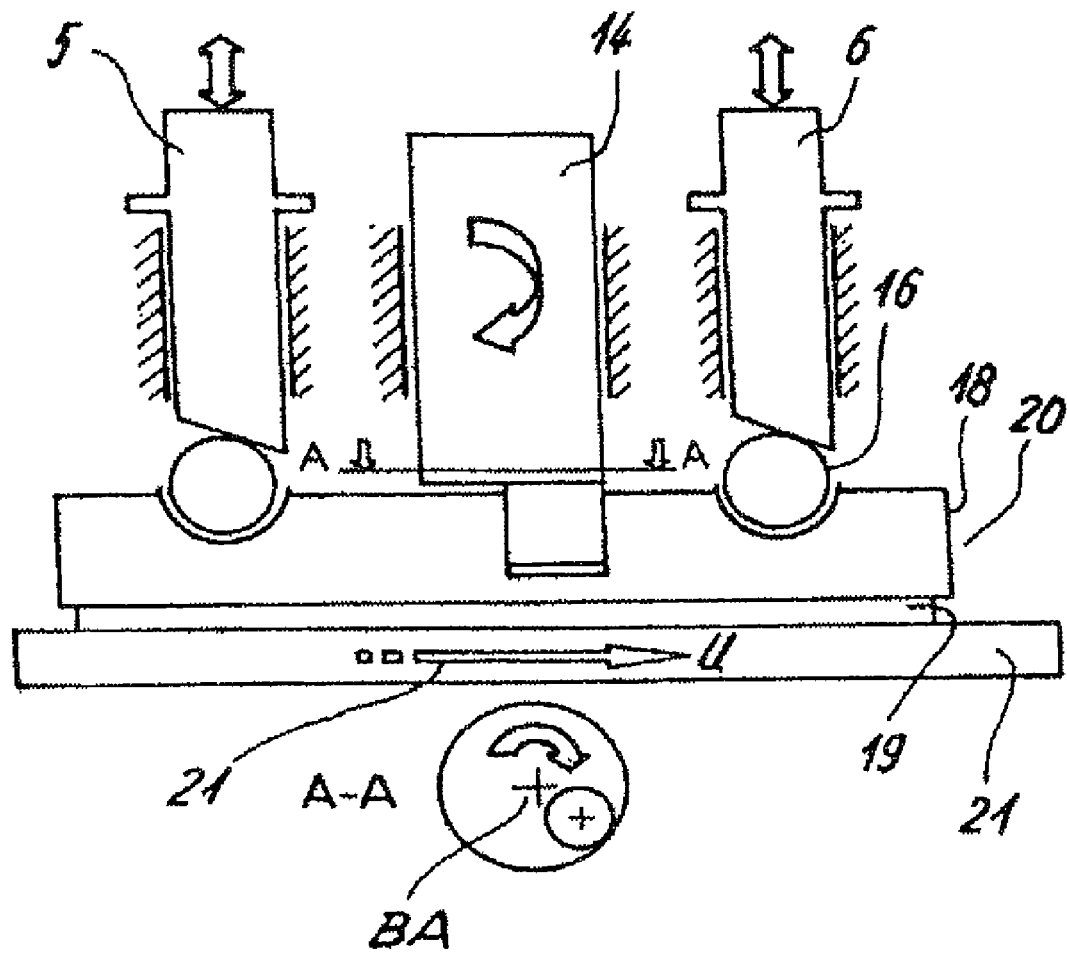
FIG. 4 is a diagram illustrating the basic function of the disk brakes shown in FIGS. 1 to 4.

FIG. 3 shows a variant with an infinitely adjustable ramp gradient and FIG. 2 shows a variant with an incrementally adjustable ramp gradient. FIG. 4 illustrates the basic functional principle in conjunction with FIG. 1.

The disk brakes according to the invention are preferably based on a fixed caliper concept in which a single-part or multi-part brake caliper 1 (also referred to as brake housing) is attached to a wheel axle so as to be unmovable in relation to a brake disk 2. On the basis of the concepts described below, a fixed caliper brake with outer, electromechanically activated and electronically closed-loop controlled wear adjustment is described. The functional principle and the features described can theoretically also be applied for other types of brakes such as, for example, sliding caliper brakes or pivoting caliper brakes. Only the caliper head of the mechanically/pneumatically activated basic brake is replaced by the electromechanical brake application unit with self-energization. A fixed saddle brake with a pneumatically actuated brake application unit of this type is presented, for example, by Germany Patent Documents DE 36 10 569 A1, DE 37 16 202 A1 or European Patent Document EP 0 688 404 A1. A fixed caliper brake with an electromotive adjustment are presented by International Patent Document WO 02/14 708 A1. Such electromotive adjustment devices can be arranged when desired in each case on the reaction side in the proposed exemplary embodiments. On the brake application side it is possible to dispense with the devices, for example sliding calipers, or the brake plungers can additionally be used to implement this function.

In FIG. 1, the brake caliper 1 is indicated only in its brake application side region. In practice, it preferably engages around the upper circumferential region of the brake disk in the manner of a frame and is attached to an axle flange (not shown here).

The brake caliper 1 has, on its side facing the brake disk 2 with a brake disk rotational axis, one or more, preferably two, openings 3, 4 and a corresponding number of brake plungers 5, 6 (two here) which are oriented parallel to the axis BA of the brake disk.

According to FIGS. 1 to 4, two brake plungers 5, 6 are arranged parallel to one another in each case.

The two brake plungers 5, 6 or adjustment pistons are each supported directly or by intermediately connected elements; plain bearing shells 9, 10 here, are supported on the rear wall 11, facing away from the brake disk, of the brake caliper. Preferably balls 7, 8 with plain bearing shells 9 are used as bearing devices.

The bearing devices are configured in such a way that they permit the brake plungers 5, 6 or adjustment pistons to rotate about their own longitudinal axis LA.

In this context, spherical segment-like (connecting link-like) recesses are formed in each case in the brake plunger 5, 6 and in the brake caliper, in one of which recesses the plain bearing shells 9, 10 are inserted (into the one in the brake caliper here) so that the balls 7, 8 can rotate relative to the plain bearing shell.

Alternatively, the balls 7, 8 can also be embodied as spherical shoulders at the ends of the brake plungers 5, 6 facing the brake caliper (not illustrated here), which ends then engage in corresponding recesses in the brake caliper with plain bearing shells.

Flat plain bearings or annular bearings or the like (not illustrated here) are also envisioned instead of the balls and recesses.

The brake plungers 5, 6 each have a spindle 12 which is provided with an external thread and on which a sleeve-like nut 13 with a corresponding internal thread is rotatably arranged. This thread can be non-self-locking or self-locking depending on the configuration.

At their side facing away from the brake disk, the nuts 13 have a flange 31, compression springs 32 which concentrically embrace the nut 13 and exert a predefined force on the flange or prestress the flange 31 relative to the inner wall of the brake caliper acting in each case between the flange 31 and the inner wall of the brake caliper 1.

Alternatively, the entire mechanism is prestressed against the pressure plate.

According to FIGS. 1 to 4, the nut 13 of each brake plunger 5, 6 is arranged on the side facing the brake disk, and the spindles 12 are arranged on the side facing the interior of the brake caliper. An inverted arrangement may also be envisioned (not illustrated here).

By screwing the nut 13 onto the spindle, the axial length of each individual brake caliper 5, 6 which is embodied in this way can be adjusted, for example in order to compensate wear of the brake lining and when the brake linings come to bear against the brake disk 2.

On the side facing the brake disk, that is to say on the pressure faces, the brake plungers 5, 6, here the nuts 13, are each provided with a ramp-like recess or contour 14 whose lowest point is preferably in the region of the longitudinal axis of the brake plungers.

This is shown particularly well in FIG. 6. According to FIG. 6, two ramps or "ramp raceways" or contours 14a, 14b which are rotated through 90° with respect to one another are provided in the nuts 13 of the brake plungers 5, 6 and they each have a different angle $+\alpha 1$, $-\alpha 1$; $+\alpha 2$, $-\alpha 2$ of aperture with respect to the longitudinal axis LA. One of the halves of each "double ramp" $+\alpha$; $-\alpha$ can be used in the forward direction of travel and the other in the rearward direction of travel.

Either one or other of the contours 14a, 14b can be used by rotating the brake plungers 5, 6 through 90°—the nuts 13 here—about their longitudinal axis when the brake is applied, which gives rise to different behaviors of the brake (this is explained in more detail below).

The recesses or raceways 14 are embodied in a spherical shape with a constant angle $\alpha$ of aperture or ramp angle $\alpha$ with respect to the longitudinal axis LA or else, for example, according to a particularly preferred variant they are preferably embodied in the manner of a variable spherical surface contour, for example oval spherical contour whose ramp angle $\alpha$ relative to the longitudinal axes LA of the brake plungers 5, 6 varies in the circumferential direction (relative to the longitudinal axis LA of the brake plungers)—for example incrementally (FIG. 6) or continuously.

In each case rolling elements 16 which are embodied as balls 16 in a preferred configuration here engage in the recesses 14.

The lowest point 14c (FIG. 6) of the ramps is advantageously configured in such a way that the rolling elements, in particular balls, are latched at the lowest point and can be released from the depression only counter to a minimum latching force.

Alternatively, according to one alternative embodiment, rolling elements (for example barrels) would be conceivable which are cylindrical or shaped in some other way and which would then roll, for example, on a groove-like recess in the brake plungers. However, it would not be possible to implement all the embodiments of the invention which are represented in FIGS. 1 to 3, as will become clear below. However, it would be possible to implement an exemplary embodiment in the manner of FIG. 1 with a groove in the pressure surfaces.

The rolling elements 16 engage on their sides facing away from the brake disk in plain bearing shells 17 which are constructed in accordance with the embodiment of the rolling elements, in the manner of spherical heads here, and they are inserted into recesses with a corresponding shape in a pressure plate 18 which bears against the carrier plate 19 of a brake application side brake lining 20 with brake lining material 21 which is arranged in the brake caliper 1 parallel to the rotational axis BA of the brake disk and so as to be movable in the circumferential direction U (or tangential or parallel direction with respect to the tangential) in relation to the brake disk 2.

A clamping spring 22 between the pressure plate 18 and nuts 13 holds the pressure plate 18 against the nuts 13 under prestress. Alternatively it is also envisioned to prestress the pressure plate in some other way, for example at the housing (caliper).

In order to drive the brake, an electric drive motor 23 is used, downstream of which a step down gear mechanism 24 is preferably arranged, the output shaft 25 of which step down gear mechanism 24 acts on a further gear mechanism 26, in particular a planetary gear mechanism which is arranged centrally between the spindles.

In this context, the output shaft 25 drives a sun wheel 27 of the planetary gear mechanism 26 which entrains planet gears 28. The planet gears 28 mesh (not illustrated in detail here) with the sun gear 27 and an internally and externally toothed ring 29. Depending on the switched state (switching capability not illustrated here) they either cause the planet star 33 or the ring 29 to rotate. The ring 29 meshes an external toothing with gearwheels 30 which are fitted onto the spindles 12 or integrally formed thereon.

In order to switch over the drive (for example an electric motor) it is possible to provide a spring-loaded ball catch mechanism (not illustrated here). The switching over process can also be implemented in some other way for example electromagnetically.

In an axial prolongation of the planet star 33, a crank 34 which is embodied in a cylindrical fashion here and arranged parallel to the axis of the brake disk is provided, the crank 34 engaging, on its side facing the brake disk 2, with a crank tappet 35, embodied off-center (eccentrically) and also oriented parallel to the axis BA of the brake disk, in a corresponding opening 36 in a brake lining unit, in which case the opening 36, which has for example a cross section which corresponds to the cross section of the crank tappet 35 or else is embodied, for example, in the manner of a connecting link, in particular an elongated hole, for example perpendicular to the plane of the figure shown.

In the exemplary embodiment in FIG. 1, the actuation device or brake application unit is composed of the two adjustment pistons or brake plungers 5, 6 which have variable lengths for the purpose of adjusting for wear and which have, in their pressure surface facing the brake disk 2, the recesses 14 in the manner of ramp contours on which the rolling elements 16 run, the rolling elements 16 transmitting the brake application force generated by the brake to the brake lining unit or to the pressure plate which rests on the brake lining.

In the pressure surface of the brake lining unit or the pressure plate 18, the rolling elements 16 are held using an oppositely configured ramp profile (not illustrated here) or in the plain bearing bed (plain bearing shells 17)-illustrated here and preferred since the rolling bodies are guided particularly securely.

The brake lining unit, composed here of the single-part or multi-part combination of the brake lining 20 and pressure plate 18 is pressed in a sprung fashion against the brake plungers and adjustment pistons 5, 6 in such a way that the rolling elements 16 arranged between them are clamped in elastically between the brake lining unit and the brake plunger.

The brake is activated after an application process of the brake lining 20 against the brake disk by displacing the pressure plate together with the brake lining 20 parallel to the frictional surface of the brake disk in the direction of rotation or the circumferential direction thereof.

This displacement is preferably brought about by the crank drive 35, 36 which acts approximately centrally on the pressure plate 18 of the brake lining 18, 20 with an output tappet and crank tappet 35, and is mounted parallel to the axis of rotation of the brake disk in the brake application housing, brake caliper 1.

The crank drive is actuated by the electric drive, for example the electric motor 28, with a gear mechanism 24 arranged downstream.

FIG. 1 shows a constant ramp angle α. A particularly simple structural design is achieved here which is defined by a robust design, good functional reliability and low manufacturing costs. In particular, an electric motor 23 with surprisingly low output power can be used. In this context, the balls 16 can be inexpensive rolling elements which as it were orientate themselves in the ramp surface. In order to increase the load bearing capacity the balls can also run in adapted ball tracks.

A variant with rollers as rolling elements 16 would, in contrast, have a particularly small hysteresis (not illustrated here).

FIG. 2 differs from the variant in FIG. 1 in that the ramp angle of the recesses 14 in the circumferential direction about the longitudinal axis of the adjustment nuts or brake pistons 5, 6 is not constant but rather variable so that, depending on the rotational position of the nuts 13, a steep ramp angle α with a different value is present. For this purpose, ball tracks with differing gradients can be arranged for the various rotational positions.

As a result, the brake application characteristic can easily be changed by rotating the nuts 13, for example by a separate adjustment actuator 39, preferably of an electromechanical design (for example a further, relatively small electric motor) which rotates the nut or nuts 13 by using an output shaft 40 with a gearwheel 41, for example by using the output wheel 41 to drive one of the nuts 13, for example on an external toothing of its flange, and by the other nut 13 being entrained by a belt drive 42 which is wrapped around both nuts 13.

In this way, a degree of self-energization which can even be achieved in the boundary region of the coefficient of friction can be increased from FIG. 1 to FIG. 2. However, the switching over can only take place in the released state since the nuts 13 cannot rotate during the brake application processes.

According to FIG. 3, the ramp angle changes continuously in a tangential fashion around the longitudinal axis LA of the brake plungers 5, 6. This is used for automatic angle adaptation.

For this purpose, a second further planetary gear mechanism 37 which is offset axially with respect to the first planetary gear mechanism 26 is connected, on the one hand, between the crank 34 and the first planetary gear mechanism 26 and is in turn arranged centrally between the brake plunger, which has an output ring 38 driven by the planetary gears 43 and which entrains the externally toothed nuts 13, while the planet star 44 of this planetary gear mechanism in turn drives the crank or rotates about its longitudinal axis.

In this way, the following operation during the application of the brakes is possible:

The application of brakes is divided into the phases
1. overcoming of the venting play,
2. build up of braking force,
3. release of the brake and
4. setting of the venting play.

Phase 1 Overcoming of the Venting Play

Before a braking operation, the initial situation is as follows.

First, the crank 34 is in a home position (FIG. 1) in which it is held, for example, by a spring-loaded ball catch (not illustrated here).

A frictional torque or holding torque which is always greater than the spindle frictional torque is applied to the adjustment nuts 3 in this situation by the compression springs 32.

First, the drive motor 23 rotates the spindles 12 in the direction of rotation which applies the brakes. The planet star 33 is locked here in the gear mechanism 26 by means of the latched crank. The external gear or the internally and externally toothed ring 29 rotates the adjustment spindles 12 in the brake-applying direction until the brake lining 21 comes to rest on the brake disk 2.

The adjustment nuts 13 are secured here against rotation by a sufficiently high holding torque.

As a result of the reaction force which builds up, the adjustment spindles or brake plungers 5, 6 become blocked against the brake disk 2 which is preferably movable, but not necessarily, and is axially movable in the case of a fixed caliper, which adjustment spindles or brake plungers 5, 6 come to rest on the lining on the reaction side (not shown here).

Phase 2 Build Up of Brake Pressure

As a result of the blocked adjustment spindles 12, the drive torque acting on the crank 34 now increases so strongly that it is released from the latched position.

The crank 31 now displaces the brake lining in the direction of rotation with respect to the brake disk 2 until the position predefined by the controller is reached (FIG. 4).

In the process, the movement component of the brake lining behaves in a nonlinear fashion in the circumferential direction—parallel to the frictional surface of the brake disks—or tangentially or parallel to the tangential U of the crank tappet, because a greater distance is firstly traveled on the circular path of the crank tappet in the circumferential direction per time unit than as the movement of the crank tappet 35 progresses on its circular path. The gear mechanism with the crank drive is therefore configured in such a way that the angular movement on the electric motor and on the output tappet in the circumferential direction is not converted into a linear movement of the brake lining but rather into a delayed movement.

Three cases are now to be distinguished.

Case 1

The current coefficient of friction of the brake lining corresponds sufficiently precisely to the tangent of the angle of inclination of the ramp in the recesses 14 or in the pressure surfaces of the adjustment nuts 13.

The predefined position is reached in this case with only a small expenditure of adjustment force.

Case 2

The current coefficient of friction of the brake lining is considerably larger than the tangent of the angle of inclination of the ramp in the recesses 14 or pressure surfaces of the adjustment nuts 13.

As a result of the excessively large self-energization, the brake lining 20 becomes stronger and is entrained further by the rotational movement of the brake disk than corresponds to the predefined position.

A rotational force in the direction of movement of the brake disk 2 is applied to the crank 34 by the brake lining.

Since the electric drive motor 23 holds the sun gear 27 of the planetary gear mechanism 26 and of the second planetary gear mechanism 37 in the desired position, the further rotation of the crank 34 and thus of the planet star 44 of the second gear mechanism 37 brings about a rotation of the outer wheel or internally and externally toothed outer ring 38 of the second gear mechanism 37 and thus also of the two adjustment nuts 13.

The holding torque of the two adjustment nuts 13 is overcome in the process.

As a result of the rotation of the adjustment nuts 13, the effective angle $\alpha$ of inclination of the ramp is changed in the direction of decreasing self-energization until the effective self-energization is adapted sufficiently precisely to the current coefficient of friction of the brake lining.

Case 3

If the current coefficient of friction of the brake lining is considerably smaller than the tangent of the angle $\alpha$ of inclination of the ramp in the recesses 14 on the pressure surfaces of the adjustment nuts 13, the brake lining is not sufficiently entrained by the low self-energization. A relatively high drive torque is thus necessary at the crank 34 in order to move the brake lining 20.

Owing to the reaction torque which becomes effective at the ring gear of the gear mechanism 24, the adjustment spindles 5, 6 are rotated in the direction of increasing the self-energization process until the tangent of the effective angle $\alpha$ of inclination of the ramp is moved again in sufficiently precise correspondence with the coefficient of friction of the brake lining.

Phase 3 Release of the Brake

In order to release the brake, the crank 34 and thus the brake lining 20 are moved back into the latched position by the electric drive motor.

The force necessary for this at the crank is low since the self-energization has been adapted in the previous braking process.

When the crank 34 latches into the latched position, a jump in torque is produced.

Evaluating the operational data of the electric drive motor (for example rotational speed, power drain) makes it possible to detect that the last position has been reached.

Phase 4 Setting of the Venting Play and Checking it

Since the crank 34 is now latched in a frictionally locking fashion, the gear mechanism 26 is actuated again as the electric drive motor 23 continues its backward rotational movement, and the adjustment spindles 12 are now rotated back by a defined amount by the gear mechanism 26 in order to release the brake and to generate the venting play.

By applying the brake linings 20 to the brake disk 2 in the first phase the venting play is checked, and by defined backward movement out of this position the venting play is set.

The measurement of the wear value is made possible by evaluating the position signal of the electric drive motor according to venting play settings.

The possibility which is provided for braking when reversing will be explained briefly below.

Braking when Reversing:

Forward travel and reverse travel are differentiated by suitable measures, for example corresponding evaluation of the rotational signal, for example of the wheel speed sensor (for example an ABS sensor) at a control device (not illustrated here) at or in the brake or at a superordinate control device of the brake system which is connected to the electric motor and/or actuates it.

After the termination of phase 1, the crank 34 is actuated in the rotational direction which corresponds to the rotational direction of the brake disk, by actuating the brakes. The invention will be considered once more from another direction below.

Firstly, the basic principle in FIG. 1 with a nonadjustable ramp gradient will be explained once more in more detail. In order to implement this embodiment, it is firstly necessary to provide a recess 14 with a ramp shape in the brake plungers 5, 6.

An opposingly shaped ramp is correspondingly formed in the brake lining pressure plate 18 or, better still, the rolling element 16 is rotatably mounted in the brake lining pressure plate 18, or a ramp is formed in the brake lining pressure plate 18 and the rolling element is mounted in the brake plunger (not illustrated here).

So that the rolling elements 16 run up on the recesses of the nuts 13 of the brake plungers 5, 6 and thus push the brake lining 20 against the brake disk it is necessary to bring about displacements of the brake lining pressure plate with the brake lining in the circumferential direction, preferably by using an adjustment element (here a crank 34) which is arranged coaxially with respect to the longitudinal axis of the brake disk and parallel thereto. The nuts 13 preferably do not rotate during the actual braking process.

A dual ramp profile (in the circumferential direction U and counter to the circumferential direction U) in the brake plunger 5, 6 permits a self-energization effect here in both directions of travel.

The crank drive 14 is preferably driven by the electric motor 23 with the gear mechanism 24, 26 connected downstream.

It is envisioned to provide a separate drive for the brake plungers or else to combine the adjustment drive and crank drive (FIG. 1 and FIG. 2). The latter has the advantage that only a single drive motor is required for both functions.

It is also envisioned here to overcome the venting play with the separate adjustment drive (phase 1 of the functional description).

It is also envisioned to overcome the venting play by using the crank drive using a particularly "steep ramp" at the start of displacement.

The dual ramp profile (recess 14) in the adjustment pistons 5, 6 permits a self-energization effect here in both directions of travel. It is possible to implement control of the displacement of the brake lining as a function of the direction of rotation of the wheel.

According to FIG. 3, the recess 13 or ramp in the brake plunger is embodied as a truncated cone-like hollow element.

The rolling element is in turn mounted in the pressure plate 18. It is thus possible to adapt the ramp gradient to the coefficient of friction of the lining by rotating the brake plungers 5, 6. The rotation of the brake plungers 5, 6 is carried out by a separate drive 39 or automatically by a branching gear mechanism 26 which can transmit the rotational movement generated by the drive motor 23 in output rotational movements both to the crank 34 and to the rotational device 12 of the brake plungers 5, 6.

The branching gear mechanism 26 is preferably a planetary gear mechanism. A displacement force which becomes active at the crank tappet 35 (displacement of the brake lining unit by the crank 34 when the self-energization is too low or pulling of the crank 34 by the brake lining unit when the self-energization is too high) brings about reaction torques in the branching gear mechanism 26 and the reaction torques attempt to bring about rotational movements at the input shaft and/or at the brake plungers 5, 6. If a sufficiently high holding force is then applied to the input shaft (for example by the drive motor which holds the position of the input shaft by its electronic controller), rotation occurs at the brake plungers 5, 6.

Given a suitable assignment of the direction of rotation of the adjustment pistons 5, 6 to the direction of the application of force to the crank tappet, the ramp gradient is rotated to relatively steep ramp angles when the self-energization is too large (brake lining unit pulls on the crank tappet), and when the self-energization is too low (crank tappet pushes the brake lining unit) it adjusts to relatively obtuse ramp angles, i.e. with the effect of increasing the self-energization.

In a version with an incrementally adjustable ramp gradient, at least two ramp paths which have different gradients and are arranged at an angle are provided. In this context the rolling elements are in turn slide-mounted in the brake lining pressure plate 18.

The ramp gradient is adapted to the coefficient of friction of the brake lining by switching over the brake plunger 5, 6 to the better adapted ramp gradient after a previous braking process during which it was necessary to switch over.

The brake plunger 5, 6 is rotated by a separate drive or automatically, for example similarly to the way described above.

The switching-over process is triggered after the end of the braking, in which case the adjustment rotational movement which acts on the brake plungers via the gear mechanism is elastically stored in a transmission element and is not implemented until the brake is released owing to the block on rotation of the brake plunger which then decreases again.

The block on rotation can be produced by frictional forces which act on the spindle as a result of the braking force or as a result of holding forces which are exerted by the electrical drive motor or an engaged clutch, for example an electromagnetic clutch, to the brake plunger itself or an element of the projection device or preferably by the balls or rolling elements which are located outside the center of the brake plunger in braking processes in a ramp path, and generates a holding torque using the braking force transmitted by the brake plunger, the positively locking accommodation in the ramp path (track) and the position which is eccentric to the center of the brake plunger.

The tracks for the ramp paths are expediently embodied in such a form that the track depth is low in the region of small brake application forces, i.e. low eccentricity of the ball or of the rolling element, and a large track depth is implemented toward the outer diameter of the brake plunger in order to achieve a high load-bearing capacity.

With this solution it is possible for direct switching over during the braking process also to occur in the region of low braking forces. Only when relatively high braking forces are present will the ball or the rolling element assume a position in the ramp track in which it is no longer possible to switch over during the braking process.

A crank drive is preferably used to drive the brake lining unit. As an alternative to a crank drive, other brake application elements such as an eccentric arrangement and the like are also conceivable if they bring about a nonlinear movement of the brake lining unit in the circumferential direction.

The electromagnetic brake is controlled in each case by a computer unit on the brake, which computer units are possibly networked or, for example, by a superordinate computer on the vehicle for one or more brakes.

A linear drive with a largely analogous arrangement is alternatively also envisioned. Instead of the crank tappet, a gearwheel segment which engages in a toothed rack on the brake lining back (not illustrated here) is fitted onto the drive shaft here.

However, the nonlinear drive is preferably used.

Figure 5:
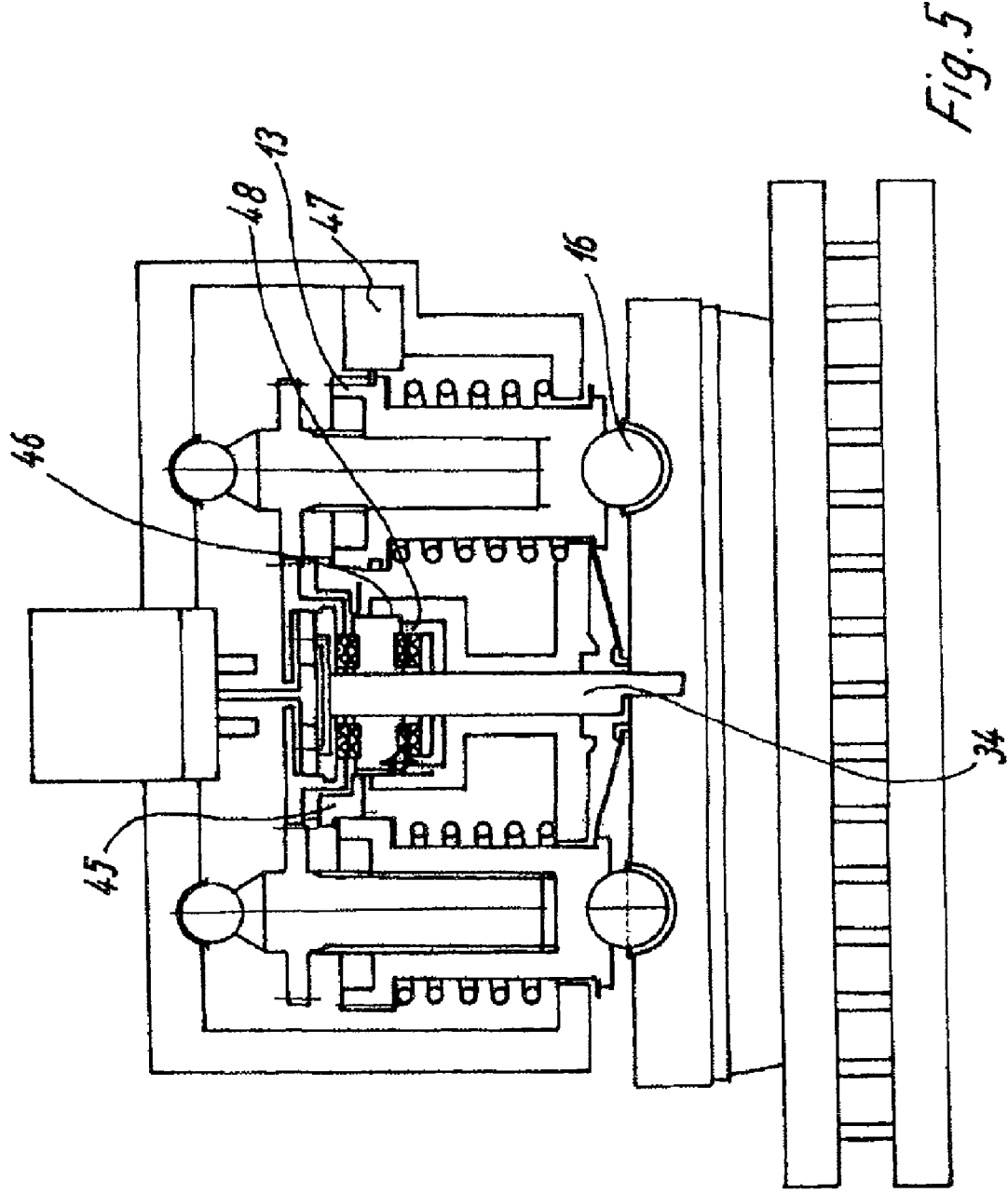
FIG. 5 is a diagram showing a sectional view of a further disk brake according to the invention.

FIG. 5 shows a further variant of the self-energizing disk brake according to the invention which corresponds substantially to the exemplary embodiment in FIG. 1.

As in the exemplary embodiment in FIG. 1, the activation device or brake application unit is composed of the two adjustment pistons or brake plungers 5, 6 which have variable lengths for the purpose of adjustment for wear and which, in their pressure surface facing the brake disk 2, have the recesses 14 in the manner of ramp contours on which the rolling elements 16 run, the rolling elements 16 transmitting the brake application force generated by the brake to the brake lining unit or to the pressure plate resting on the brake lining.

In addition, an engageable clutch, here for example a magnetic clutch 46, in particular a clutch with bistable-action actuating magnets, is provided and is designed to shift the crank 34 in and out of the drive train, for example on an axially movable radial toothing 48. In this way it is possible, for example, to firstly brake in a selective way for parking braking operations or even exclusively only by the brake plungers 5, 6 or else it is possible, for example, for relatively small adaptation braking operations to be carried out solely by rotating the brake plungers 5, 6 or by changing the axial length of the brake plungers. If, on the other hand, a "normal" service braking process is initiated, the clutch is switched over and the braking process is carried out by means of the crank 34.

In addition, according to FIG. 5 a switching device 47 is provided for rotating the brake plungers, here the nuts, from one raceway 14a to the other raceway 14b. This switching device 47 can be configured as a separate electric motor or else as a switching magnet or the like which rotates one of the nuts 13 through 90° using, for example, a toothed rack or the like, in which case the other of the nuts 13 is entrained, for example by a crown gear 45.

It is also to be noted that the present brake designs can also be considered to be particularly advantageous in terms of their control behavior.

If, for example, a normal force closed-loop control process is carried out which is considered not to be usable according to the prior art as the only closed-loop control, it has an advantageous effect that this normal force can be determined very precisely by, for example, supporting the brake plungers on the brake caliper, with a force parallel to the longitudinal axis of the brake plungers by, for example, arranging corresponding sensors on the brake plungers and/or adjacent elements.

The following listing of reference symbols is provided to assist in the description of the present invention:

LIST OF REFERENCE SYMBOLS

Brake caliper 1
Brake disk 2
Openings 3, 4
Brake plunger 5, 6
Ball bearings 7, 8
Plain bearing shells 9, 10
Rear wall 11
Spindle 12
Nut 13
Ramp-like recess 14
Rolling element 16
Plain bearing shells 17
Recesses 15
Pressure plate 18
Carrier plate 19
Brake lining 20
Brake lining material 21
Clamping spring 22
Drive motor 23
Step-down gear mechanism 24
Output shaft 25
Gear mechanism 26
Sun gear 27
Planetary gears 28
Ring 29
Gearwheels 30
Flange 31
Pressure springs 32
Planet star 33
Crank 34
Crank tappet 35
Opening 36
Gear mechanism 37
Ring 38
Adjustment actuator 39
Output shaft 40
Gearwheel 41
Belt drive 42
Planetary gears 43
Planet star 44
Crown gear 45
Magnetic clutch 46
Switching device 47
Ramp angle α
Longitudinal axis LA
Circumferential direction U
Axis of brake disk BA

The invention claimed is:

1. A method for actuating a self-energizing brake having an electric actuator, comprising the acts of:
amplifying an activation force applied by the electric actuator using a self-energizing device arranged between the actuator and brake lining;
coupling the actuator to one of an open-loop and closed-loop control device configured to actuate the actuator;
setting a position of the brake lining unit with a brake application unit actuated by an electromotive drive of the electric actuator;
performing the closed-loop control process on the basis of braking system parameters for a vehicle controlled variable "braking or deceleration", an actuator manipulated variable "current or actuator position";
compensating tolerance-conditioned braking force differences among the wheel brakes using a third controlled variable; and
before activating the brake actuator, overcoming a venting play with an adjustment device, to remove the venting play as a fault source when beginning application of the brake by the brake actuator.

2. A method for actuating a self-energizing brake having an electric actuator, comprising the acts of:
amplifying an activation force applied by the electric actuator using a self-energizing device arranged between the actuator and brake lining;
coupling the actuator to one of an open-loop and closed-loop control device configured to actuate the actuator;
setting a position of the brake lining unit with a brake application unit actuated by an electromotive drive of the electric actuator;
performing the closed-loop control process on the basis of braking system parameters for a vehicle controlled variable "braking or deceleration", an actuator manipulated variable "current or actuator position";
compensating tolerance-conditioned braking force differences among the wheel brakes using a third controlled variable; and
compensating with correction factors the predefined set point values of the braking system parameters for an influence of brake lining compression due to a wear condition and a temperature of brake linings.

3. The method as claimed in claim 2, further comprising determining the wear condition of the brake linings for each brake, and evaluating an energy balance of a brake's thermal content to determine the brake linings temperature.

4. A method for actuating a self-energizing brake having an electric actuator, comprising the acts of:
amplifying an activation force applied by the electric actuator using a self-energizing device arranged between the actuator and brake lining;
coupling the actuator to one of an open-loop and closed-loop control device configured to actuate the actuator;
setting a position of the brake lining unit with a brake application unit actuated by an electromotive drive of the electric actuator;
performing the closed-loop control process on the basis of braking system parameters for a vehicle controlled variable "braking or deceleration", an actuator manipulated variable "current or actuator position";
compensating tolerance-conditioned braking force differences among the wheel brakes using a third controlled variable; and
eliminating during a calibration process tolerance influences for room temperature conditions of a gear mechanism and an electric motor.

5. The method according to claim 3, further comprising evaluating the energy balance by one of an electronic brake system and an electronic controller integrated into the brakes.

* * * * *